(No Model.)
J. P. RICKMAN & J. B. THOMPSON.
MANUFACTURE OF AMMONIA AND ITS SALTS.
No. 278,823. Patented June 5, 1883.
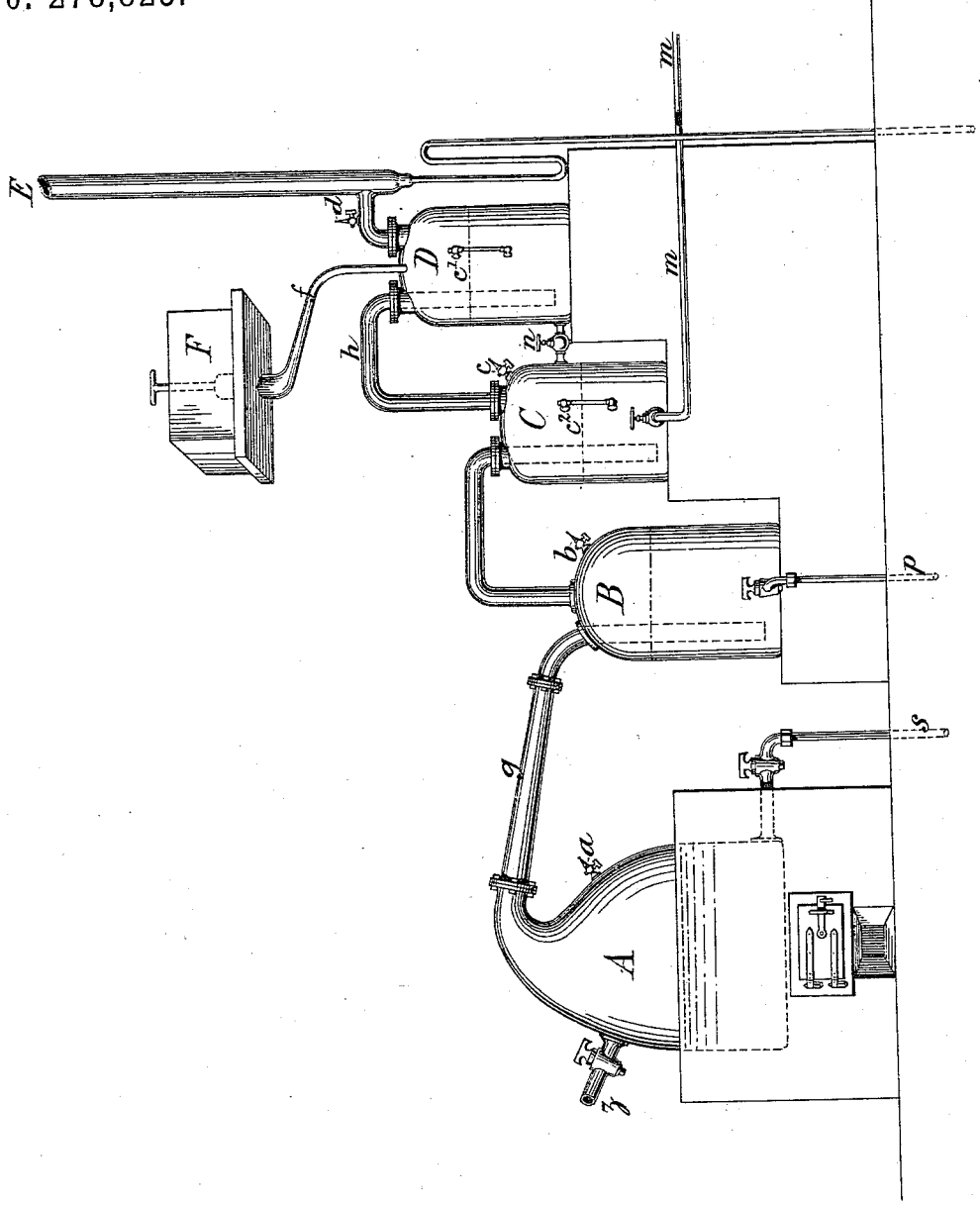

UNITED STATES PATENT OFFICE.

JAMES PELLATT RICKMAN AND JACOB BAYNES THOMPSON, OF NEW CROSS, COUNTY OF KENT, ENGLAND.

MANUFACTURE OF AMMONIA AND ITS SALTS.

SPECIFICATION forming part of Letters Patent No. 278,823, dated June 5, 1883.

Application filed October 7, 1882. (No model.) Patented in England July 12, 1882, No. 3,305, and in Belgium September 25, 1882, No. 59,106.

*To all whom it may concern:*

Be it known that we, JAMES PELLATT RICKMAN and JACOB BAYNES THOMPSON, both subjects of Her Majesty the Queen of Great Britain and Ireland, residing at New Cross, in the county of Kent, England, have invented new and useful Improvements in the Manufacture of Ammonia and its Salts, (for which we have obtained provisional protection in England, dated July 12, 1882, and numbered 3,305;) and we do hereby declare that the following is a full, clear, and exact description, which will enable others skilled in the art to which it appertains to make and use the same.

Our invention relates to the manufacture of ammonia and ammonium salts from crude urea and uric acid as they are found in urine and animal excreta. When solid excreta are treated they are in the first place rendered fluid by water, and sufficiently alkaline by the addition of caustic alkali or alkaline earth. When liquid is treated it also is rendered alkaline, if necessary.

The first part of our process is the decomposition of the urine or animal excreta, and the formation of ammonia and ammonium carbonate. This may be effected by adding an alkali or alkaline earth with protracted boiling; but we prefer to effect it by fermentation in the following manner: The liquor is put into an air-tight tank, and animal ferment in active operation is added to it. This animal ferment may, in the first place, be obtained by the putrid fermentation of mucine, which is abundantly contained in ox-gall, and when fermentation is once set up in the liquor part of the active liquor can be used as a ferment. A smaller air-tight tank, lined with lead, is provided in certain cases, and is in free communication with the air-space in the upper part of the larger tank. This smaller tank contains sulphuric or hydrochloric acid, according to the salt intended to be made; but when hydrochloric acid is used sufficient water is added to prevent it from fuming, otherwise ammonium chloride will be formed in the fermenting-tank. The acid solution in the smaller tank absorbs the free ammonia that is disengaged in the larger tank during fermentation. When the fermentation is completed there will not be found any urea or uric acid in the liquor; but instead thereof ammonia and ammonium carbonate.

The second part of the process is the separation of the ammonia from the liquor. This is effected by distillation at a moderate heat, preferably without ebullition, although ebullition would not be detrimental. For this purpose it is preferred to use two stills, (the first being heated,) the second placed at some distance from the first, with a pipe passing from the head of the first still down nearly to the bottom of the second. The first still receives the liquor from the fermenting-tank, and the second still intercepts the greater portion of the water evaporated in the first still. This water is usually sufficiently heated to drive off from the second still the ammonia, which is then collected in suitable condensers, with or without the aid of an exhauster. The condensing-vessels may with advantage be charged with solution from the smaller tank, described as communicating with the fermenting-tank. When the solution in the first condenser is saturated it is transferred to an open boiler or pan, in which it is concentrated. When it is sufficiently dense it is run into a cooler to crystallize, and the mother-liquor being drained off, the crystals are dried. The mother-liquor may be added to fresh saturated solution and again boiled down, and so on continuously. The condensation of the ammonia may be performed in the ordinary way, but the preceding method is to be preferred.

In the annexed drawing, A is the primary still; B, the secondary or intercepting still; C, the first condenser, and D the second condenser. E is the exit for the vapor, and F a vessel containing the feed-acid. $a\ b\ c\ d$ are test-taps, and $c'\ c^2$ are gages.

The mode of working is as follows: The liquor to be treated is fed through the pipe $z$ into the still A, under which a gentle fire is kept, preferably below the point of ebullition. At the commencement of the process the secondary still B is empty, but the first and second condensers, C and D, respectively, are each charged about one-third with acid. The vapor from the primary still A passes through the pipe g into the secondary still B, carrying with it ammonia and heating the secondary or intercepting still B. The apparatus will not be in full operation until heated throughout and vapor is passing up the exit-flue E. The pressure in the still A caused by the heat is sufficient to work the whole series, and there will be no ammonia pass beyond the second condenser, D, as will be easily shown at the test-tap d. This would not be so if an exhauster were used. There would then have to be a scrubber fitted where the vapor-exit E is now placed. When the acid in the first condenser, C, begins to be nearly saturated the ammonia will begin to pass into the second condenser, D, through the pipe h. This will be shown at the test-tap c, and the solution can be tested at the gage $c^2$, and when it becomes neutral or slightly alkaline, it is run off through the pipe m to an open pan to be boiled down, whence it is run to the coolers to crystallize. The acid solution in the second condenser, D, is then run into condenser C through the pipe n, and D is again recharged from the acid-feed F through the pipe f. When the ammonia is all driven off from the liquor in the primary still A it will be shown by applying test-paper at the test-tap a, and if it be, then the test-paper is applied at the test-tap b, and if the water in the secondary still B be not then giving off ammonia, it may all be run off through the pipe p, as also the spent liquor in the primary still A through the pipe s; but if not, the distillation must be continued a little longer to draw off all the residue from the water. The stills A and B must then be both emptied and A recharged with liquor and the work carried on as before.

We do not, however, limit ourselves to the precise details in this apparatus and mode of working thereof, so long as the results obtained are the same—that is to say, first, that the urea is decomposed thoroughly and quickly without the loss of free ammonia; secondly, that the distillation is carried on with as little water as possible being carried over with the ammonia to the condensers; and, thirdly, that the water carried over to the condensers is still more reduced by the acid solution being heated and the water evaporated, as it is in the preceding arrangement of apparatus.

We are aware that aqua-ammonia has been manufactured from the spent liquor of gas-works by a process in which sulphuric acid is employed, and we are also aware that ammonia has been manufactured from fresh urine or animal excreta by the addition of caustic alkali or alkaline earth; and, also, it is known that the fermentation of animal excreta is hastened by the addition of similar material in a state of putrefaction. We ferment the urea or uric acid to prevent any foreign matter passing from the urea in the distillation and discoloring the product.

We claim and desire to secure by Letters Patent—

1. The method herein specified of treating urine or other equivalent animal excreta for the production of ammoniacal salts, consisting in mixing with the animal excreta or other nitrogenous material stale urine or a portion of a similar material in a state of fermentation, closing the vessel containing the same, and passing the ammoniacal gases evolved into a vessel containing acid, substantially as set forth.

2. The method herein specified of manufacturing salts of ammonia, consisting in introducing animal excreta or other nitrogenous material into a vessel with a portion of stale urine or similar material in a state of fermentation, excluding the atmosphere, and conveying the ammoniacal gases evolved into a vessel containing acid, drawing off the impure solution of ammoniacal salts into a still, volatilizing the ammoniacal substances by heat, passing the same through an intercepting still for the removal of impurities, and conveying the ammoniacal vapors into a vessel containing sulphuric acid, for the formation of sulphate of ammonia, and then withdrawing such sulphate of ammonia for evaporation and crystallization, substantially as set forth.

In testimony whereof we affix our signatures, this 18th day of September, 1882, in presence of two witnesses.

JAMES PELLATT RICKMAN.
JACOB BAYNES THOMPSON.

Witnesses:
ERNEST DE PASS,
   68 *Fleet Street, London.*
JOHN DEAN,
   17 *Gracechurch Street, London.*